Oct. 21, 1952 M. CAMRAS 2,615,097

DEVICE FOR INCREASING THE EFFECTIVENESS OF THE TRANSDUCING FIELD OF A MAGNETIC HEAD

Filed Jan. 12, 1949

Inventor
Marvin Camras
by The Firm of Charles Hill Attys

Patented Oct. 21, 1952 2,615,097

UNITED STATES PATENT OFFICE 2,615,097

DEVICE FOR INCREASING THE EFFECTIVENESS OF THE TRANSDUCING FIELD OF A MAGNETIC HEAD

Marvin Camras, Chicago, Ill., assignor to Armour Research Foundation of Illinois Institute of Technology, Chicago, Ill., a corporation of Illinois Application January 12, 1949, Serial No. 70,448

9 Claims. (Cl. 179—100.2)

This invention relates to an electromagnetic transducer head, and more particularly, to means for improving the efficiency of operation of electromagnetic transducer heads for magnetic recording apparatus.

Considerable difficulty is experienced in the design of electromagnetic transducer heads in attempting to control such factors as leakage flux and the distribution of flux at points in the transducer structure where the operating function is performed. A desired condition would be that in which unwanted leakage flux is reduced to a minimum, and the flux performing the operating function is concentrated in the area of use. For example, in the case of a conventional electromagnetic erase head for magnetic recording apparatus, the effective operating flux is derived from that portion which bridges the air gap in the space through which the magnetic record member passes, and practically all the remaining flux may be considered as extraneous, as far as the operating function is concerned. A good portion of the extraneous flux is that which by-passes the gap by pumping across the sides of the magnetic loop as leakage and that which leaks across the confronting pole tips just below the record member.

It is, therefore, a particularly important object of the present invention to provide a transducer head having a minimum of leakage flux and an increase in effective operating flux.

It is another object and feature of the present invention to provide a novel means for increasing the efficiency of operation of electromagnetic transducers.

Another object of the present invention is to provide a novel means for improving the operating characteristics of electromagnetic transducer heads by reducing flux density in portions of the magnetic circuit operating at high flux density and increasing the flux density at portions where it aids in performing the function of the head.

Still another object of the present invention is to provide a novel means for producing a higher erase field in an electromagnetic erase head than is possible with a conventional head.

A still further object of the present invention is to provide an electromagnetic transducer head having novel means for increasing the fringing field at the portion of the gap of the head over which associated record members pass.

A further object of the present invention is to provide a novel means for increasing the efficiency of electromagnetic transducer heads without varying the physical core structure of such units.

A still further object of the present invention is to provide a novel means for improving the operating results of electromagnetic transducer heads in magnetic recording apparatus.

The novel features which I believe to be characteristic of my invention are set forth with particularity in the appended claims. My invention itself, however, both as to its manner of construction and method of operation, together with further objects and advantages thereof, may best be understood by reference to the following description taken in connection with the accompanying drawing, in which:

Figures 1, 2, 3, 4, 5:
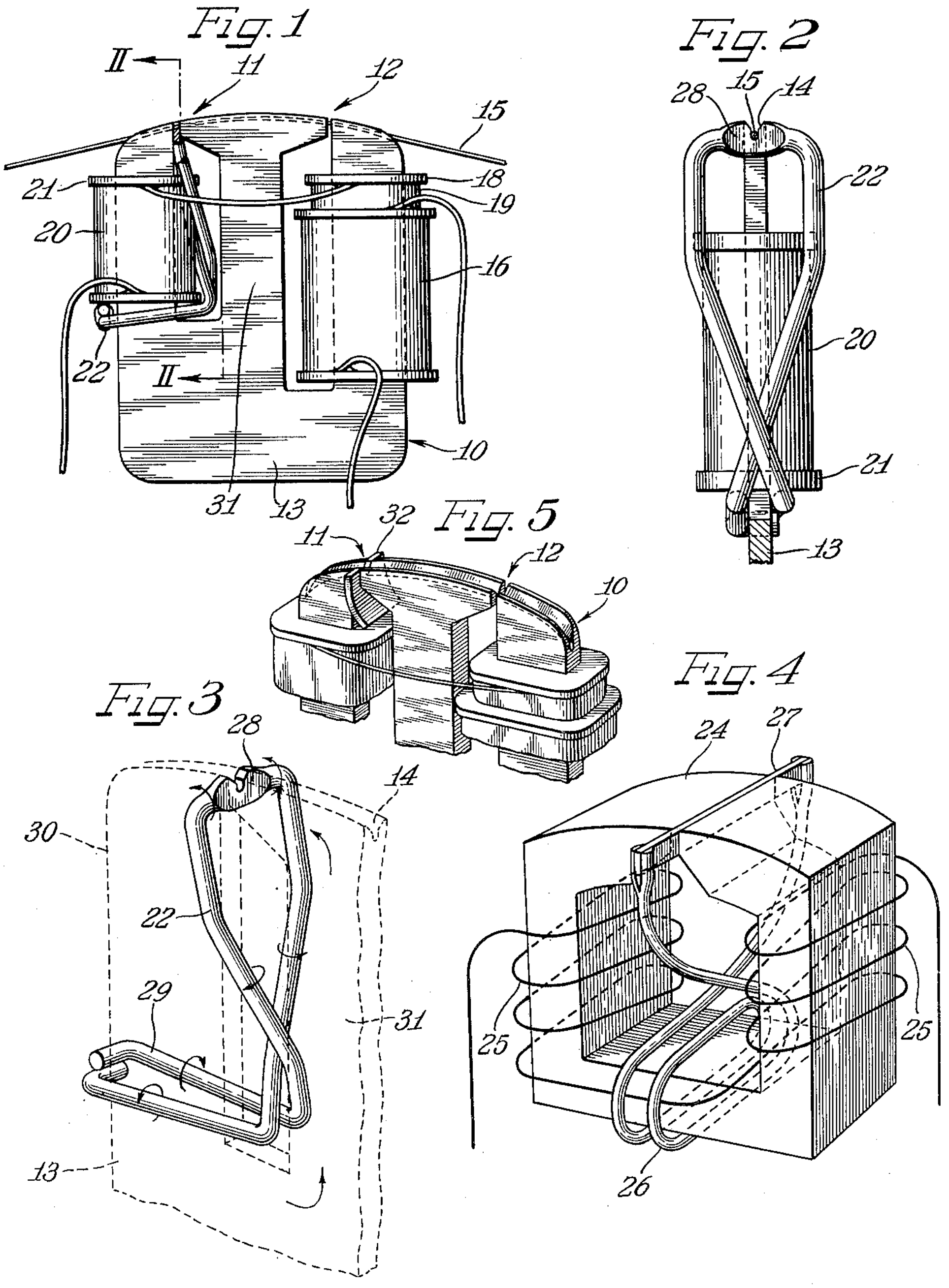
Figure 1 is an elevational view of a transducer assembly embodying the principles of my invention.
Figure 2 is an enlarged view of a portion of the assembly of Figure 1 as taken on line II—II.
Figure 3 is a perspective view of an element embodied in the transducer shown in Figures 1 and 2.
Figure 4 is a perspective view of another embodiment making use of the principles of my invention.
Figure 5 is a fragmentary perspective view of a modified form of head of the type shown in Figures 1, 2 and 3 of the drawings.

Referring to the drawings in greater detail:

In Figure 1 is illustrated a transducer head assembly 10, including an erase head portion 11 and a record-playback head portion 12. The magnetic circuit of each head portion is integrated in a common single lamination magnetic circuit structure 13. The transducer assembly is provided with a record groove 14 running across the top of the structure 13 and having a portion conforming to the contour of the record member which in the present embodiment is a wire record member 15. Two magnetic circuit loops exist in magnetic structure 13, each corresponding to one of the magnetic head portions 11 and 12. Each loop contains an air gap at the top of the structure which determines the point at which the operating function of its perspective head is performed on the recording wire 15.

The flux developed in the magnetic loop is produced by energizing coils wound on spools disposed on the outer leg of each loop. The loop corresponding to the magnetic head portion 12, besides being energized by an audio frequency coil 16 wound on one section of a double section spool 18, is also energized by a high frequency bias coil 19 wound on the other section of the spool 18. The record-playback head 12, therefore, during a recording operation, is energized by both an audio frequency current and a high frequency current in coils 16 and 19, respectively, and thus is arranged for magnetic recording in accordance with the principles explained in detail in my United States Letters Patent No.

2,351,004, issued June 13, 1944, and entitled "Recording Method for High Frequency Bias."

The magnetic circuit loop corresponding to magnetic head portion 11 is energized by a high frequency coil 20 wound on a spool 21. Since erase operations and recording operations are usually performed simultaneously by the transducer assembly 10, the high frequency coils 18 and 21 are connected in series and the series branch so formed is connected to a source of high frequency current, such as a separate high frequency oscillator (not shown). The audio signal coil 16 is connected to a signal current source (also not shown) which feeds the audio signal to be recorded.

It is an outstanding feature of my invention that a short-circuited secondary loop conductor of non-magnetic conducting material is disposed within both the magnetic circuit loop and part of the gap of the erase head 11.

The single conductor forming the short-circuited secondary is formed into a figure 8 configuration as illustrated in Figure 3. It is made of high conductivity material such as copper or silver and is made of large cross-section to aid in reducing the resistance of the circuit. Another possibility is to make the secondary of stranded conductor material to reduce eddy current losses which in some instances would be more easy to wind than a single heavy conductor. One loop of the figure 8 is wound about a leg 30 of the magnetic circuit while the other is bent upward within the opening in the core structure 13 which lies between legs 30 and 31 to allow a flattened portion 28 therein to fit within the air gap of the magnetic circuit. The flattened portion is provided with a notch conforming in shape to the record member groove 14 and is aligned with that groove at the top of the transducer assembly. The cross-over point in the secondary is insulated to prevent short circuiting which would result in the formation of two secondary loops. The cross-over point is preferably disposed near the bottom of the core opening, and the sides of the vertical loops placed on each side of the energizing coil 20 as it extends up to the air gap.

In some instances, it may be desired to have the portion of the secondary disposed within the gap of the magnetic structure, or the whole secondary, insulated. Soldering or otherwise directly securing the conductor to one or both of the confronting gap forming portions of the magnetic circuit, on the other hand, modifies the magnetic characteristics of the head in a manner which may in some instances also be advantageous. The means to be utilized in each particular case can be determined by the conditions surrounding the use of the individual magnetic heads.

Current flowing in the short-circuited secondary 22 creates a field in flowing through the top flattened portion 28 of the short-circuited secondary 22 which is in an additive sense with the field produced by the winding 20 in the region where the wire 15 crosses the head portion 11. In the region immediately below the flattened portion 28, however, which is the region within the core of the short-circuited secondary, a field is created which opposes the field of the leakage flux below the flattened portion 28, and thus cuts down the total amount of leakage flux in the head. The lower loop portion 29 of the short-circuited secondary 22 which is wrapped around the leg 30 of the core 13 helps to cut down the flux in the region immediately below the erase coil 20. This tends to overcome the disadvantage of previous heads of the tendency of the core material to saturate in the region immediately below the erase coil.

More specifically, when arranged in this manner, the field developed about the secondary circuit opposes the main flux at the portions of the magnetic circuit where the secondary surrounds that circuit. This is illustrated in Figure 3 by the arrows which represent the flux direction. If, at the instant represented, the flux in the main magnetic circuit has a counterclockwise direction, the flux about the secondary takes a clockwise direction; thus the secondary field opposes the main field tending to leap across the window, as well as at portions where the secondary surrounds the main magnetic circuit. At the magnetic circuit gap, however, the secondary field adds to the effective operating flux, since the flux direction at the top of the secondary conductor has the same direction as the flux tending to pass across the gap.

Another distinctive feature of this arrangement is that the portion of the secondary field passing under the secondary conductor has a direction opposing any flux tending to span the tapered underside of the confronting pole tips, thus, further aiding in the action to concentrate the effective operating flux at the top of the gap where it has its greatest effectiveness in performing the operating functions of the transducer head. This action is in addition to the action of the portion of the secondary conductor disposed within the gap to provide a shielding effect which also tends to make the main flux jump across the top of the gap.

In Figure 4 is illustrated an embodiment of my invention which may be used with recording apparatus utilizing tape-type recording members. As it is, its width is thicker in proportion so that the entire width of a record member which may pass over its active gap portion will be contacted. The magnetic circuit forming the transducer head 24 is energized by a pair of coils 25. The secondary 26 consists of a conductor wound one or more times about the magnetic circuit and joined to a non-magnetic conducting bar 27 acting as a spacer within the gap created by the confronting pole tips of the magnetic circuit. The secondary 26 is insulated to prevent shorting of the loops. Current flowing in the short-circuited secondary 26 creates a field in passing across the connecting bar 27 thereof which is in an additive sense with the field produced by the windings 25 in the region where the tape crosses the head. In the region immediately below the bar 27, however, which is the region within the coil of the short-circuited secondary, a field is created which opposes the field of the leakage flux below the bar 27 and thus cuts down the total amount of leakage flux in the head.

Figure 5 of the drawings is a fragmentary perspective view of a modified form of head embodying certain of the novel principles and teachings of the present invention. It has been found in practice that certain beneficial advantages can be obtained without the use of a loop such as shown in Figures 1 to 4 of the drawings, provided that the gap length is sufficiently large; and particularly, it has been found that if an eddy current member 32 is disposed in the gap of the erase portion 11 of the head 13 and is made of a high conductivity material, such as silver or copper, a sufficient amount of circulating current is induced in the member 32 to substantially increase the normal field in the region where the record member is spanning the gap.

In normal practice, the record-playback gap portion 12 of the head 10 has a gap length of two mils or less, and, indeed, this gap is usually in the neighborhood of one-half to one mil. The erase gap portion 11 on the other hand has a gap length of from three mils to fifteen mils and preferably between four to ten mils. The pronounced reinforcing effect obtained by the eddy current member is found to occur when this member is of a thickness greater than about three mils. The fact that this necessary dimension corresponds approximately with the desired gap for an erase head makes such a member extremely advantageous for use in an erase head or in erase head portions of a combined head structure. It will be observed that the fluctuating currents which set up the alternating field of the erase head are of relatively high frequency, usually from 20 to 60 kilocycles or higher. The eddy current effect is, therefore, much more prominent than would be occasioned were the fluctuating field induced by currents of audio frequency.

Where reference is made herein to the upper limit of this audible range, it shall be deemed to refer to approximately 16 kilocycles.

While I have shown and described certain embodiments of my invention, it will, of course, be understood that I do not wish to be limited thereto since many modifications may be made, and I, therefore, contemplate by the appended claims to cover all such modifications that fall within the true spirit and scope of my invention.

I claim as my invention:

1. In combination with an electromagnetic transducer head including a magnetic circuit with a gap therein and means for accommodating a moving magnetic record member over said head, a secondary circuit having one or more loops surrounding a portion of said magnetic circuits and at least one cross-over loop having a portion disposed within said gap.

2. In combination with an electromagnetic transducer head having means for accommodating a magnetic record member over said head and having a magnetic circuit loop and a gap formed of confronting pole tips in said loop, a non-magnetic conductor having a portion of its length disposed within said gap, said conductor being electrically closed upon itself and having at least one loop formed therein wound about a portion of said magnetic circuit loop and a cross-over between said gap filling portion and said loop portion.

3. In combination with an electromagnetic transducer head including a magnetic circuit with a gap at one side of said circuit and means for accommodating a moving magnetic record member over said head, a closed secondary circuit formed of a non-magnetic conducting material having a portion thereof looped about said magnetic circuit at a side opposite to said gap and another portion filling in said gap, said conductor having an insulated cross-over point between said gap filling portion and said looped portion.

4. In combination with an electromagnetic transducer head having a magnetic circuit with a gap therein and means for accommodating a moving magnetic record member over said head, an energizing coil wound about one side of said magnetic circuit adjacent said gap, a secondary circuit having at least one loop wound about a portion of said magnetic circuit adjacent said energizing coil, said secondary circuit having one cross-over loop extending over the side of said energizing coil and having a portion disposed within and traversing the width of said gap.

5. In combination with the magnetic circuit of an electromagnetic transducer structure of the type having a magnetic gap therein and provided with means for accommodating a magnetic record member over said gap, a closed secondary circuit, said secondary circuit having a portion wound about a portion of said magnetic circuit and a loop traversing a plane between portions of opposite polarity in said magnetic circuit.

6. In an electromagnetic transducer of the type having a magnetic gap therein and provided with means for accommodating a magnetic record member over said gap, a primary energizing circuit and a secondary flux shielding circuit, said secondary circuit having at least one flux shielding loop disposed between portions of opposite magnetic polarity in said transducer.

7. In an electromagnetic transducer having a magnetic circuit with a gap formed of confronting ends of said circuit and having means for accommodating a magnetic record member over said gap, a closed secondary circuit having a portion disposed within said gap.

8. In an electromagnetic transducer head, a core having a pair of spaced upstanding legs terminating in confronting pole portions with a gap therebetween, over which a magnetic record member is arranged to pass, a current carrying spacer member of high electrical conductivity extending from one pole portion to the other and making mechanical contact with each, said spacer member extending laterally and downwardly appreciably beyond the confines of said gap but leaving open a substantial portion of the space between said legs, said spacer member having a field generated thereabout to augment the normal gap flux passing through said record member as it spans said gap.

9. In an electromagnetic transducer head, a core having a pair of spaced upstanding legs terminating in confronting pole portions with a gap therebetween, over which a magnetic record member is arranged to pass; a current carrying spacer member of high electrical conductivity extending from one pole portion to the other and making mechanical contact with each, said spacer member extending laterally and downwardly appreciably beyond the confines of said gap, a coil mounted on at least one of said legs, said spacer member terminating short of the top of said coil and having a field generated thereabout to augment the normal gap flux passing through said record member as it spans said gap.

MARVIN CAMRAS.

REFERENCES CITED

The following references are of record in the file of this patent:

UNITED STATES PATENTS

| Number | Name | Date |
|---|---|---|
| 1,255,441 | Larson | Feb. 5, 1918 |
| 2,225,967 | Berman | Dec. 24, 1940 |
| 2,277,305 | Clopton | Mar. 24, 1942 |
| 2,431,540 | Camras | Nov. 25, 1947 |
| 2,469,444 | Roys | May 10, 1949 |
| 2,555,110 | Bobb | May 29, 1951 |